(12) United States Patent
Smed

(10) Patent No.: US 9,300,097 B2
(45) Date of Patent: *Mar. 29, 2016

(54) MULTI-FUNCTION POWER STRIP

(71) Applicant: Ole Falk Smed, Calgary (CA)

(72) Inventor: Ole Falk Smed, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,782

(22) Filed: Sep. 17, 2015

(65) Prior Publication Data

US 2016/0020570 A1    Jan. 21, 2016

Related U.S. Application Data

(63) Continuation of application No. 14/147,314, filed on Jan. 3, 2014, now Pat. No. 9,147,982, which is a continuation of application No. 13/110,644, filed on May 18, 2011, now Pat. No. 8,622,756.

(51) Int. Cl.
| | |
|---|---|
| *H01R 25/00* | (2006.01) |
| *H01R 27/02* | (2006.01) |
| *H01R 13/66* | (2006.01) |
| *H01R 25/14* | (2006.01) |
| *H01R 9/24* | (2006.01) |

(52) U.S. Cl.
CPC .............. *H01R 27/02* (2013.01); *H01R 9/2408* (2013.01); *H01R 13/6633* (2013.01); *H01R 13/6675* (2013.01); *H01R 25/142* (2013.01)

(58) Field of Classification Search
CPC . H01R 9/2408; H01R 13/6675; H01R 25/142
USPC .................................... 439/120, 214
See application file for complete search history.

(56) References Cited

U.S. PATENT DOCUMENTS

| | | | |
|---|---|---|---|
| 8,622,756 B2 * | 1/2014 | Smed ............... | H01R 9/2408 439/120 |
| 9,147,982 B2 * | 9/2015 | Smed ............... | H01R 9/2408 |

* cited by examiner

*Primary Examiner* — Tho D Ta
(74) *Attorney, Agent, or Firm* — Carl A. Hjort, III

(57) ABSTRACT

Embodiments of a multi-function power strip are shown, said strip including a first endcap and a second endcap; at least one rail, said rail being adapted to engage with at least one outlet module; the rail also being engaged with a transformer module, said transformer module in electrical connection with the at least one outlet module, and adapted to receive electrical power therefrom, said transformer module further comprising a transformer adapted to transform electrical power into a plurality of voltages suitable for powering a plurality of different models of electronic accessories, and a connector forming a circuit to provide a suitable one of the plurality of voltages to an electronic accessory; and wherein the at least one outlet module and the transformer module are releasably joined together.

20 Claims, 5 Drawing Sheets

MULTI-FUNCTION POWER STRIP

CROSS-REFERENCE TO RELATED APPLICATIONS

The present application is a continuation of U.S. application Ser. No. 14/147,314, filed Jan. 3, 2014, now U.S. Pat. No. 9,147,982, which is a continuation of U.S. application Ser. No. 13/110,644, filed May 18, 2011, now U.S. Pat. No. 8,622,756, all having the same title, and all of which are incorporated herein by this reference.

DETAILED DESCRIPTION OF THE DRAWINGS

Embodiments of a multi-function power strip are shown and described. Generally, the multi-function power strip comprises a cord for connection to an electrical power source; a plurality of outlet modules in electrical connection with the cord, wherein said plurality of outlet modules are in electrical connection with each other; and a transformer module, said transformer module in electrical connection with at least one of the outlet modules, and adapted to receive electrical power therefrom, said transformer module further comprising, a transformer adapted to transform electrical power into a plurality of voltages suitable for powering a plurality of different models of electronic accessories, and a connector electrically connected to the transformer, and having a plurality of pins, each of the plurality of pins having a designated one of the plurality of voltages supplied thereto, and wherein the connector is configured to engage with a plurality of plugs, each of the plugs forming an electrical connection with a designated one of the plurality of pins and a ground pin, thereby forming a circuit to provide a suitable one of the plurality of voltages to an electronic accessory; and wherein the outlet modules and the transformer module are releasably joined together. Thus, embodiments of the multi-function power strip are assembled by combining together and electrically connecting a number of modular components into a single assembly.

Figure 1:
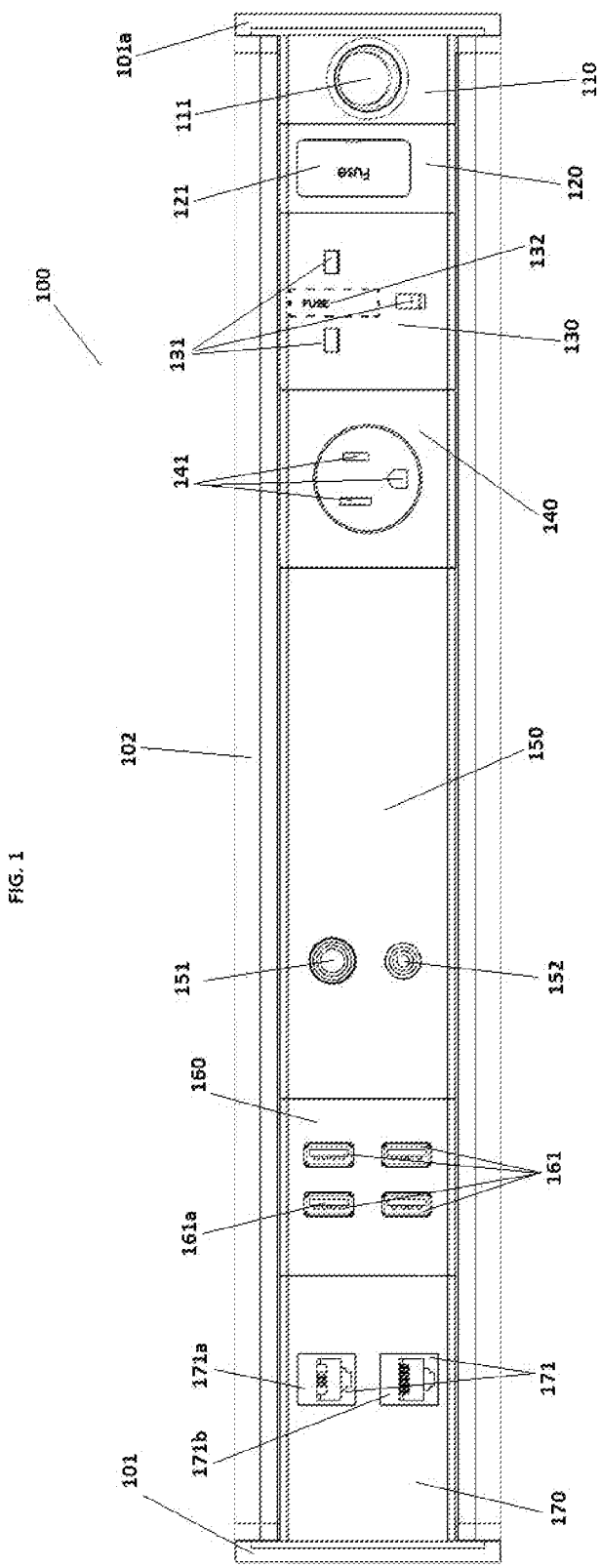
FIG. 1 is a top view of an embodiment of the multi-function power strip.

FIG. 1 shows a top view of a first embodiment of the multi-function power strip. As can be seen in FIG. 1, multi-function power strip 100 is comprised of endcaps 101 and rail 102. Various modular components (which will be discussed in greater detail infra) are engaged with rail 102 and retained in engagement with rail 102 by end caps 101. Endcaps 101 may attach to rail 102 by means of screws or other fasteners commonly used in the art. Alternatively, endcaps 101 may engage with rail 102 by means of a friction-fit or snap-fit, and thereby be retained in connection to the rail 102. First endcap 101a is provided with a coupler (not shown) into which a cord (not shown) can be received. The cord (not shown) provides standard household electrical power, which one of skill in the art would appreciate can be between 110 and 240 volts, alternating current, with a frequency between 50 and 60 Hz. The cord is received in the endcap, and the endcap is electrically connected to the first modular component in the multi-function power strip, thereby providing household electrical power to the first modular component, and all other modular components that are joined thereto.

Referring again to FIG. 1, it will be appreciated that a number of modular components are engaged with rail 102. All of the modular components are electrically connected together, and each receives electrical power from the previous component in the chain. The structure and function of each will now be explained in greater detail. As shown in FIG. 1, an embodiment of multi-function power strip 100 may include a switch module 110. Switch module 110 is provided with switch 111. Switch 111 may be a single pole, single throw switch. As one of ordinary skill in the art will readily appreciate, switch 111 may be any type of switch known to the art which is capable of operating under the load conditions imposed by the transmission and handling of ordinary household electrical power, as referenced above. Switch module 110 is electrically coupled to the first end cap 101a, and in such way it receives household electrical power from the cord (not shown) through the first endcap 101a. Switch module 110 is also electrically coupled to the next modular component in the chain, which in FIG. 1 is fuse module 120. Electrical power flows into switch module 110, through switch 111, and out of switch module 110 into the next modular component in the chain. An indicator light (not shown) may be provided on the housing of switch module 110, or it may be incorporated into the switch 111, as in the case of a rocker switch with light to indicate it is in the "ON" position, thereby alerting a user to the status of the power strip. By manipulating switch 111, a user may selectively turn on and off the flow of electrical power through switch module 110 to other modular components further down the chain electrically connected to switch module 110. For this reason, switch module 110 may be provided near the beginning of the chain of modular components but it need not be. As with all of the modular components disclosed herein, the order of the components is not critical to the operation of the multi-function power strip. As long as the modular components are in electrical connection with each other, the order in which they are assembled is a matter of convenience to suit the nature of the area being serviced by the multi-function power strip.

Referring again to FIG. 1, the next modular component in the chain following the switch module 110 is the fuse module 120. As with all of the modular components described, fuse module 120 is electrically connected to and receives electrical power from the component in the chain before it (i.e. in this case, the switch module). Electrical power then passes through a fuse 121 and then flows out of fuse module 120 into the next component in the chain. As one of ordinary skill in the art will readily appreciate, fuse 121 may be any type of fuse known to the art which is capable of operating under the load conditions imposed by the transmission and handling of ordinary household electrical power. Alternatively, fuse 121 may be a circuit breaker, a ground fault circuit interruptor or any other device designed to protect an electrical circuit from damage caused by overload or short circuit by detecting a fault condition and interrupting continuity to discontinue electrical flow. The fuse 121 may be completely enclosed in the housing of fuse module 120, such that it is not accessible by a user. Alternatively, in cases where a circuit breaker or other device that must be reset by a user after a fault occurs are used, the fuse 121 may be mounted so that it protrudes from the housing of fuse module 120, so as to be accessible by a user.

Also shown in FIG. 1 is a first outlet module 130. As with all of the modular components described, first outlet module 130 is electrically connected to and receives electrical power from the component in the chain before it (i.e. in this case, the fuse module). The flow of electrical power is then split, and is sent both to outlet receptacles 131 and out of first outlet module 130 into the next component in the chain. One of ordinary skill in the art will appreciate that many different configurations of outlet receptacles 131 have been developed and implemented in various countries throughout the world. For example, Type A and Type B outlet configurations are commonly used in North America. The Type C outlet configuration is commonly used in continental Europe. The Type G outlet configuration is commonly used in the United Kingdom and the Type I configuration is commonly used in Australia and New Zealand. The following outlet configurations are recognized by those of ordinary skill in the art: a Type A outlet, a Type B outlet, a Type C outlet, a Type D outlet, a Type E outlet, a Type F outlet, a Type E/F hybrid outlet, a Type G outlet, a Type H outlet, a Type I outlet, a Type J outlet, a Type K outlet, a Type L outlet, and a Type M outlet. Outlet receptacles 131 may take the form of any of the outlet configurations recited above. For example, in FIG. 1, the outlet configuration of first outlet module 130 is a Type G outlet. In this way, the power strip may be adapted to function in various countries using different outlet configurations. Within the housing of first outlet module 130 may be provided a fuse 132 in the electrical power supply line ahead of outlet receptacles 131, to protect any electrical circuits plugged into the outlet receptacles from overload or short circuit. Fuse 132 may be used in addition to or in place of a fuse module 120.

Also shown in FIG. 1 is a second outlet module 140. Second outlet module 140 is the same in all respects as first outlet module 130, except that second outlet module 140 may have a different outlet configuration than first outlet module 130. Alternatively, second outlet module 140 may have the same outlet configuration as first outlet module 130. For example, in FIG. 1, second outlet module 130 has a Type B outlet configuration, which is different than first outlet module 130, which has a Type G outlet configuration. As with all of the modular components described, second outlet module 140 is electrically connected to and receives electrical power from the component in the chain before it (i.e. in this case, the first outlet module). The flow of electrical power is then split, and is sent both to outlet receptacles 141 and out of second outlet module 140 into the next component in the chain. Although not shown, within the housing of second outlet module 140 may be provided a fuse in the electrical power supply line ahead of outlet receptacles 141, to protect any electrical circuits plugged into the outlet receptacles from overload or short circuit. The fuse may be used in addition to or in place of a fuse module 120.

The transformer module 150 is also shown in FIG. 1. As with all of the modular components described, transformer module 150 is electrically connected to and receives electrical power from the component in the chain before it (i.e. in this case, the second outlet module). Disposed within the transformer module is a transformer (not shown). The transformer receives household electrical power from the previous component in the chain. The transformer is adapted to transform the household electrical power into a plurality of voltages suitable for powering a plurality of different models of electronic accessories. By way of example and without limitation, the transformer may be one of those supplied by the Trade Management Group Ltd. One of ordinary skill in the art will readily appreciate that any transformer capable of operating under the load conditions imposed by the transmission and handling of ordinary household electrical power and capable of producing a plurality of output voltages may be suitable for use in transformer module 150. By way of example, and without limitation, the transformer may be adapted to produce the following output voltages: 16V, 18V, 20V, 22V and 24V. All of the preceding voltages may be provided at a current of approximately 5A or less. Transformer module 150 may include a primary output connection 151. Primary output connection 151 may be provided with a plurality of pins (not shown). Each of the plurality of pins may have a designated one of the plurality of voltages produced by the transformer supplied thereto. Additionally, a ground pin may be provided as one of the plurality of pins in the primary connector. In use, a plurality of cords with plugs may be provided to the user. Each of the plurality of plugs will fit into the primary output connector 151 in such a way as to form an electrical connection with a designated one of the plurality of pins and the ground pin, thereby forming a circuit to provide a suitable one of the plurality of voltages to an electronic accessory. Each of the plurality of plugs will only fit into the primary output connector 151 in a specified way, thus each of the cords and associated plugs supplies one of the designated voltages to an electronic accessory. The user determines which plug and cord combination to use to power a specified electronic accessory.

Transformer module 150 may also be provided with a secondary output connector 152. In addition to the voltages produced by the transformer and output to the primary output connector 151, the transformer may be adapted to produce certain secondary output voltages. By way of example and without limitation, the secondary output voltages produced by the transformer may be: 5V, 12V, 15V, and 22V. All of the preceding voltages may be provided at a current of approximately 5A or less. In a similar fashion as described above, secondary output connection 152 may be provided with a plurality of pins (not shown). Each of the plurality of pins may have a designated one of the plurality of secondary output voltages produced by the transformer supplied thereto. Additionally, a ground pin may be provided as one of the plurality of pins in the secondary connector. In use, a plurality of cords with plugs may be provided to the user. Each of the plurality of plugs will fit into the secondary output connector 152 in such a way as to form an electrical connection with a designated one of the plurality of pins and the ground pin, thereby forming a circuit to provide a suitable one of the plurality of secondary output voltages to a secondary electronic accessory. Each of the plurality of plugs will only fit into the secondary output connector 152 in a specified way, thus each of the cords and associated plugs supplies one of the designated secondary output voltages to a secondary electronic accessory. The user determines which plug and cord combination to use to power a specified secondary electronic accessory.

Also shown in FIG. 1 is USB module 160. As with all of the modular components described, USB module 160 is electrically connected to and receives electrical power from the component in the chain before it (i.e. in this case, the transformer module). USB module is provided with USB ports 161, which are standard Universal Serial Bus (USB) ports. Power may be provided to USB ports 161 in two ways. In a first embodiment, the transformer in transformer module 150 may produce a USB electrical power output. By way of example and without limitation, such USB electrical power output may be a 5V 2A power output. The USB electrical power output is then sent from the transformer module 150 to the USB module 160 and distributed through the USB ports 161. In an alternate embodiment, a USB transformer may be provided within USB module 160. In this embodiment, the USB module receives household electrical power from the prior component in the chain (i.e. the transformer module) and steps it down to a voltage suitable for distribution through the USB ports 161.

Several other aspects of the USB module 160 will now be further explained. Universal Serial Bus (USB) is a specification to establish communication between devices and a host controller (usually a personal computer), and can be used to connect computer peripherals to a personal computer. USB connections can also be used with other devices such as smartphones, PDAs and video game consoles. USB connectors supply electric power to the devices connected thereto, so devices connected by USB may not require a power source of their own. One of ordinary skill in the art will readily appreciate that the parameters of the output from the USB ports 161 is governed by the USB standard. The USB 2.0 standard is commonly used in many applications, and USB module 160 and the output of USB ports 161 may be selected to conform to that standard. Alternatively, the USB 3.0 standard has recently introduced, and USB module 160 and the output of USB ports 161 may be selected to conform to that standard. As noted above, USB connections may be used to supply power to a device or to recharge the batteries contained in a portable device. When used for charging, the electrical power supplied to the USB ports 161 may be 5V and 0.5 A. One of ordinary skill in the art will readily appreciate that certain electronic accessories, most notably Apple® products, require a higher charging amperage than those of devices which comply with the USB standards. Such devices requiring higher charging amperages may require as much as 2 A for proper charging. It should appreciated that the power supplied to all or a portion of USB ports 161 could be standard USB power or higher amperage charging power to accommodate devices which require higher charging amperages.

Additionally, it should be appreciated that charging electronic devices and providing USB power are not the only functions that the USB module 160 can perform. USB module 160 may also serve as a USB hub. A USB hub is a device that expands a single USB port into several so that there are more ports available to connect devices to a host system. In such an arrangement, one of the USB ports 161a may be designated a USB hub port and may be connected via a USB cable (not shown) to a USB port on a personal computer. USB module 160 may contain electronic circuitry required to allow USB module 160 to act as a USB hub. Most USB hubs use one or more integrated controller (IC's), of which several designs are available from various manufacturers and are well known to persons of skill in the art. The IC's control the flow of data between the USB hub port 161a and the remaining USB ports 161, and thereby allows the remaining USB ports 161 to act as additional USB ports connected to the personal computer connected to the USB hub.

Also shown in FIG. 1 is network module 170. Depending on the functionality implemented, network module 170 may or may not require a source of electrical power. In an embodiment where network module 170 does require electrical power, network module 170 is electrically connected to and receives electrical power from the component in the chain before it (i.e. in this case, the USB module). The power received by network module 170 may be standard household electrical power, and network module 170 may contain a transformer (not shown) for stepping down the household electrical power to a voltage suitable for use in the network module. Alternatively, the component in the chain before the network module 170 (in this case, the USB module) may transform the household electrical power into a voltage suitable for use in the network module 170 and then pass that voltage on to the network module 170. Network module 170 is provided with network ports 171. Network ports 171 may be RJ45 connectors for receiving LAN (Local Area Network) data signals. Alternatively, network ports 171 may be RJ11 connectors for receiving telephone signals, or BNC connectors for receiving cable TV signals or other data signals. One of ordinary skill will appreciate that network ports 171 may take the form of any connector necessary to connect the required data stream to the network module 170. Inside network module 170 is provided a fuse, circuit breaker or the like (not shown). The fuse, circuit breaker or the like is electrically connected between first network port 171a and second network port 171b, and provides voltage and current surge protection between the two ports. In operation, a data feed cable (not shown) is connected to first network port 171a. A personal computer or other device may then be connected via a data cable to second network port 171b. In the event of a voltage or current spike in the data circuit, the fuse, circuit breaker or the like provided in network module 170 will trip, thereby preventing said voltage or current spike from reaching the personal computer or other device connected to second network port 171b. In this way, network module 170 may act as a pass-through surge suppressor for LAN, telephone, CATV or other data feeds.

It should be appreciated that network module 170 may also have more advanced features. For instance, network module 170 may function as a network switch. A network switch serves as a controller, enabling networked devices to exchange data with each other efficiently. Network switches are capable of inspecting data packets as they are received, determining the source and destination device of each packet, and forwarding them appropriately. By delivering messages only to the connected device intended, a network switch conserves network bandwidth. If network module 170 is to be configured as a network switch, electrical power may be provided to the network module 170 as described supra. If network module 170 is to be configured as a network switch, network module 170 may be provided with more network ports than shown in FIG. 1, for example, network module 170 may be provided with four network ports. One of the network ports may be designated a LAN input port and may be connected via a LAN cable (not shown) to a local area network. Network module 170 may be provided with electronic circuitry required to allow network module 170 to act as a network switch. Most network switches use one or more integrated controller (IC's), of which several designs are available from various manufacturers and are well known to persons of skill in the art. The IC's control the flow of data between the LAN input port and the remaining network ports, and thereby allows the remaining network ports to act as additional network ports for connecting additional devices to the local area network. The network switch electronic circuitry inside the network module 170 directs data on the LAN to the appropriate devices connected to the network ports. Thus, the switch allows multiple devices to be connected to a single LAN connection, and provides for the accurate routing of data to the devices so connected.

Figure 2:
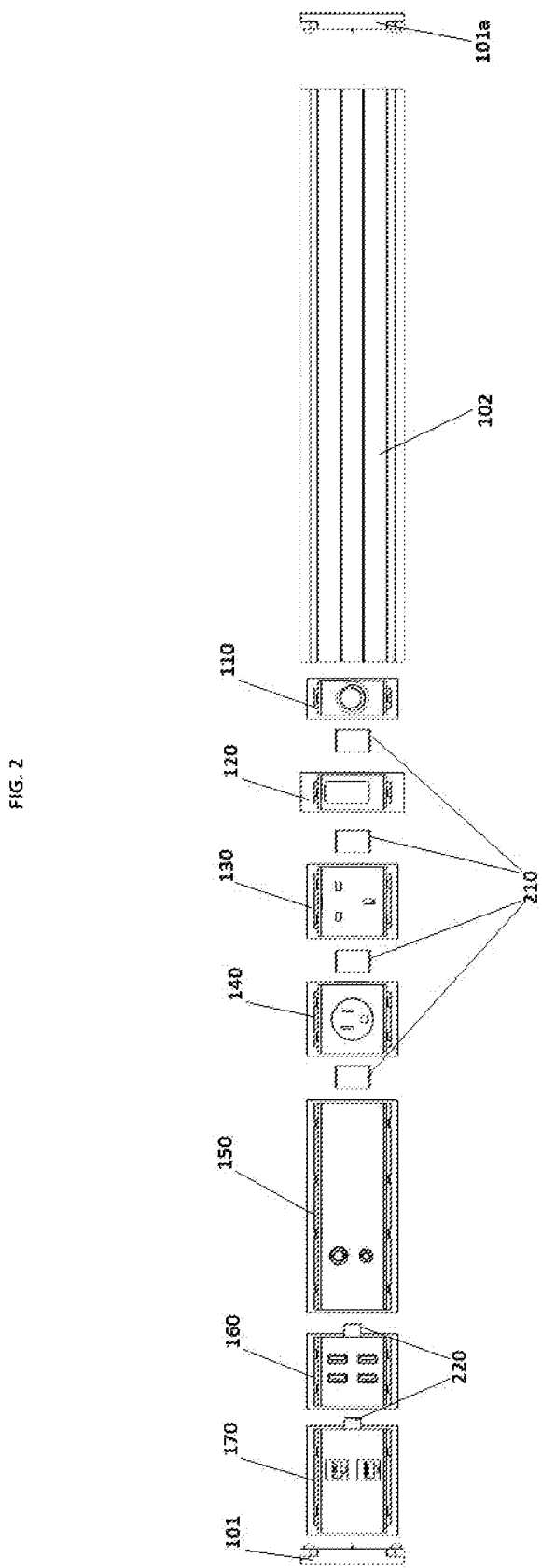
FIG. 2 is a top exploded view of an embodiment of the multi-function power strip.

FIG. 2 shows a top exploded view of an embodiment of a multi-function power strip 100. Like numbers will be used to designate components already described with respect to FIG. 1. As can be seen in FIG. 2, first endcap 101a and endcap 101 are provided, as is rail 102. Additionally, switch module 110, fuse module 120, first outlet module 130, second outlet module 140, transformer module 150, USB module 160 and network module 170 are provided. As can be readily seen in the exploded view, all of the aforementioned modules are slidably engaged with the rail 102, and retained in engagement with the rail 102 by the endcaps 101. As has been previously pointed out, it should be appreciated that not all of the aforementioned modules need be provided in every embodiment of the power strip. For example, only a single outlet module may be provided, or the USB and/or network modules may be left out of the configuration. Thus, depending on the customer's desire for the functionality of the device, certain modules may be excluded from the assembly, or certain modules may be included in numbers in excess of what has been shown in FIG. 2, as in the case where a customer desires numerous outlet modules in addition to all the other modules. It should be readily appreciated that rail 102, as an extruded part, may be cut to any length and therefore may accommodate any number of modules as requested by the customer. The only limitation on the number of modules, and hence the overall length of rail 102 and relatedly the assembly 100 is that the maximum power that can be drawn by the combination of all of the modules in the power strip is 4000 Watts. As long as the combined modules draw less than the aforementioned maximum power, any combination of modules, and any length of rail 102 necessary to accommodate those modules may be used.

Also shown in FIG. 2 are module connectors 210. Module connectors 210 electrically connect the various modules in the power strip assembly together. Module connectors 210 mate with electrical contacts formed in the housings of the various modules (not shown) and thereby electrically connect two adjacent modules together. The structure of the module connectors 210 will be explained in greater detail with reference to FIG. 5. Referring again to FIG. 2, note that certain modules do not employ module connectors 210. As shown in FIG. 2, USB module 160 and network module 170 use attached connectors 220 to electrically connect those modules to the previous component in the chain. Attached connectors 220 have essentially the same structure as module connectors 210 with the exception being that attached connectors 220 are permanently attached to the module that they connect to the previous component in the chain. One of ordinary skill will readily appreciate that either module connectors 210 or attached connectors 220 could be used to electrically connect any or all of the modules in the power strip together, and the selection of either module connector 210 or attached connector 220 is simply a matter of preference or improvement of the manufacturability of the power strip.

Figure 3:
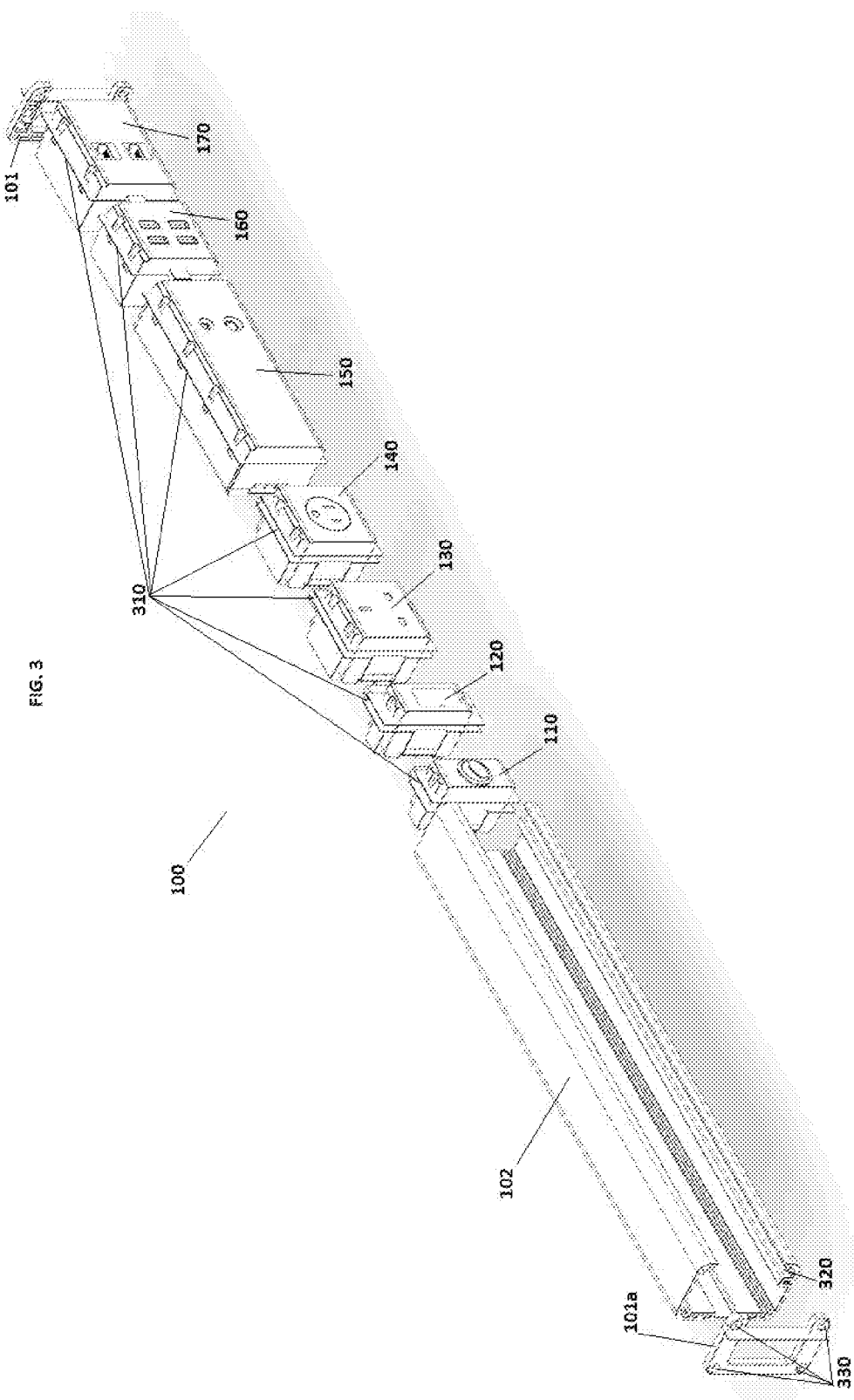
FIG. 3 is an isometric exploded view of an embodiment of the multi-function power strip.

FIG. 3 shows an isometric exploded view of an embodiment of the multi-function power strip 100. Like numbers will be used to designate components already described with respect to FIG. 1. As can be seen in FIG. 3, first endcap 101a and endcap 101 are provided, as is rail 102. Additionally, switch module 110, fuse module 120, first outlet module 130, second outlet module 140, transformer module 150, USB module 160 and network module 170 are provided. FIG. 3 illustrates the manner in which the various modules engage with rail 102. As can be in FIG. 3 all of the modules are provided with tabs 310. Tabs 310 slidably engage with groove 320 in rail 102, and thereby retain the modules in the rail. Endcaps 101 and 101a engage with the ends of rail 102, and have holes 330 provided therein for attachment means (not shown) to secure the endcaps 101, 101a to the rail 102. The modules can be slid into and out of engagement with rail easily for assembly and for disassembly in the event it becomes necessary to replace one of the modules.

Figure 4:
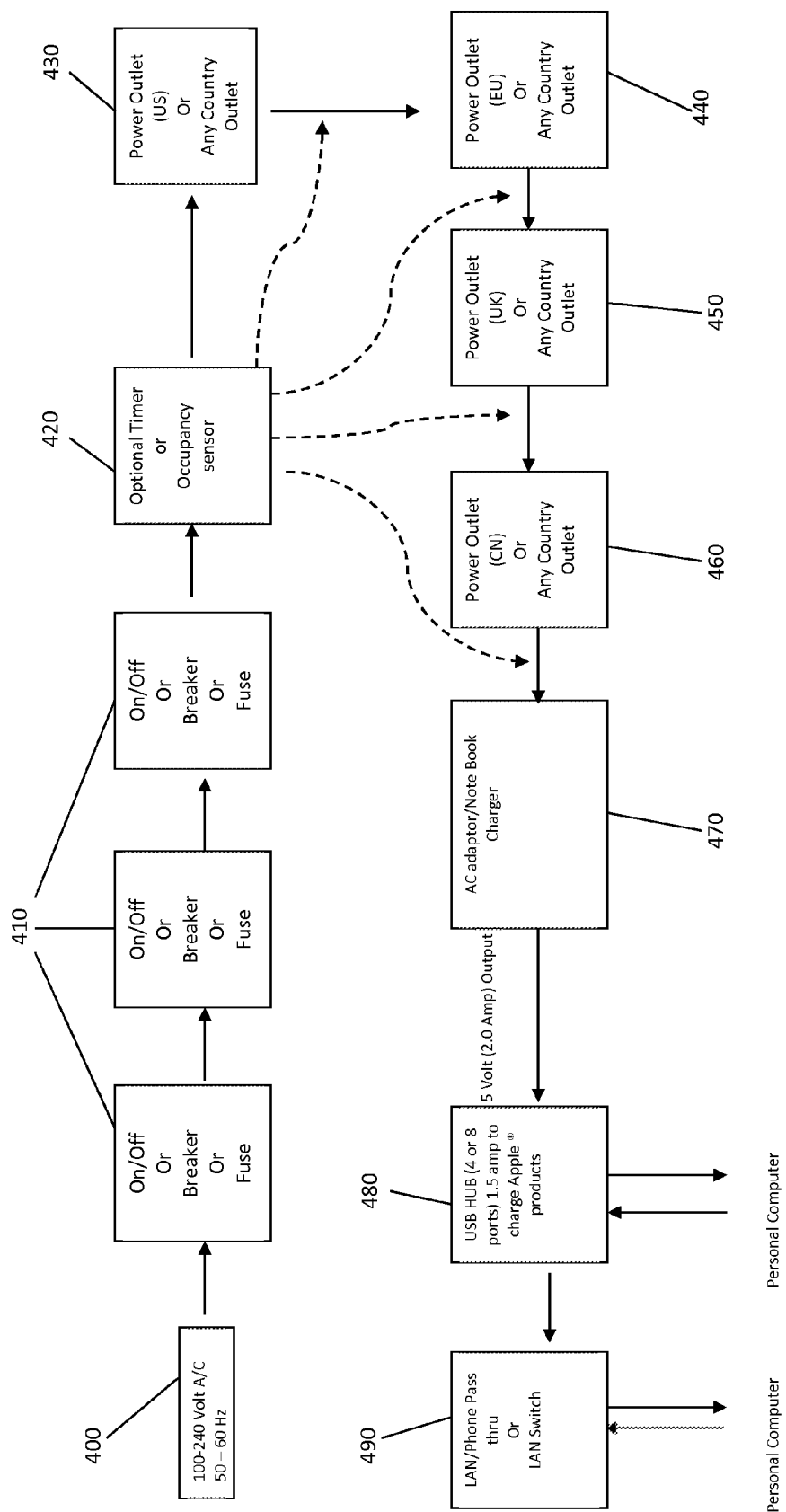
FIG. 4 is a block diagram showing the inter-relation of parts in an embodiment of the multi-function power strip.

FIG. 4 shows a block diagram showing the inter-relation of parts in an embodiment of the multi-function power strip. As shown in FIG. 4, power source 400 is a standard household electrical power source and is the power input into the multi-function power strip. The electric power may then pass through components 410 which may be an on/off switch, a circuit breaker or a fuse. The electrical power may pass through a single one, two or all three of these components, depending on the configuration of the multi-function power strip. Electrical power may then pass through an optional timer or occupancy sensor 420. If component 420 is a timer module, it may be a standard programmable timer that is configured to permit the flow of electrical power to components down the chain for certain periods of the day, and to block the flow of electrical power to components down the chain for certain other periods of the day. Such timers are well known to those of skill in the art, as is their inclusion in a circuit of this type. If component 420 is an occupancy sensor module, it may contain an occupancy sensor adapted to detect the presence of a person in the area adjacent to the power strip and to turn off electrical power to components down the chain of the power strip when a person is not present in the area adjacent to the power strip. One of ordinary skill in the art will readily appreciate that any occupancy sensor switch suitable for use in the area around a power strip would be suitable for use as an occupancy sensor in occupancy sensor module 420. Occupancy sensor module 420 may operate by detecting infrared radiation in the area surrounding the power strip that is produced by the presence of a person. In operation, when occupancy sensor module 420 detects the presence of a person in the area surrounding the power, it allows the flow of electrical power to modules down the chain of the power strip. If the occupancy sensor does not detect the presence of a person in the area surrounding the power strip, it interrupts the flow of electrical power to the components down the chain.

As shown in FIG. 4, electrical power then passes into outlet modules 430, 440, 450 and 460. The dashed lines in FIG. 4 show possible routes for the electrical power, showing that it may travel through one, two, three or all four of the outlet modules, depending on the configuration of the power strip. As shown in FIG. 4, the outlet modules are all of different configurations, outlet module 430 is a United States configuration outlet; outlet module 440 is a European configuration outlet; outlet module 450 is a United Kingdom configuration outlet; and outlet module 460 is a Chinese configuration outlet. One of ordinary skill will appreciate that the outlet modules may all have different configurations as shown or they may all be of a single configuration, or they may be a combination of two or more configurations. Each of the outlet modules is configured so that electrical power may be transferred to a device plugged into the outlet module, and also that electrical power is transferred to the next component in the chain. From the last outlet module, electrical power is then flows into the transformer module 470. As discussed with respect to FIG. 1, transformer module 470 steps down household electrical power to a plurality of voltages suitable for powering electronic accessories and outputs those voltages though a multi-pinned connector adapted to mate with a plurality of plugs and thereby supply the appropriate voltages to electronic accessories. Electrical power then flows into USB module 480. As shown in FIG. 4, transformer module 470 may step household electrical power down to a 5V 2A output for USB module 480. Alternatively, USB module 480 may contain a transformer which transforms electrical power into a voltage suitable for use in USB module 480. In such an embodiment, household electrical power would flow from transformer module 470 to USB module 480. USB module 480 may receive data from and transmit data to a personal computer or other device in the case where USB module 480 acts as a USB hub. USB module 480 may provide a source of power to network module 490. Network module 490 may act as a pass-through surge suppressor or network cables, phone cables or other data feeds. Alternatively, network module 490 may act as a network switch and may receive data from and transmit data to a personal computer or other device.

Figure 5:
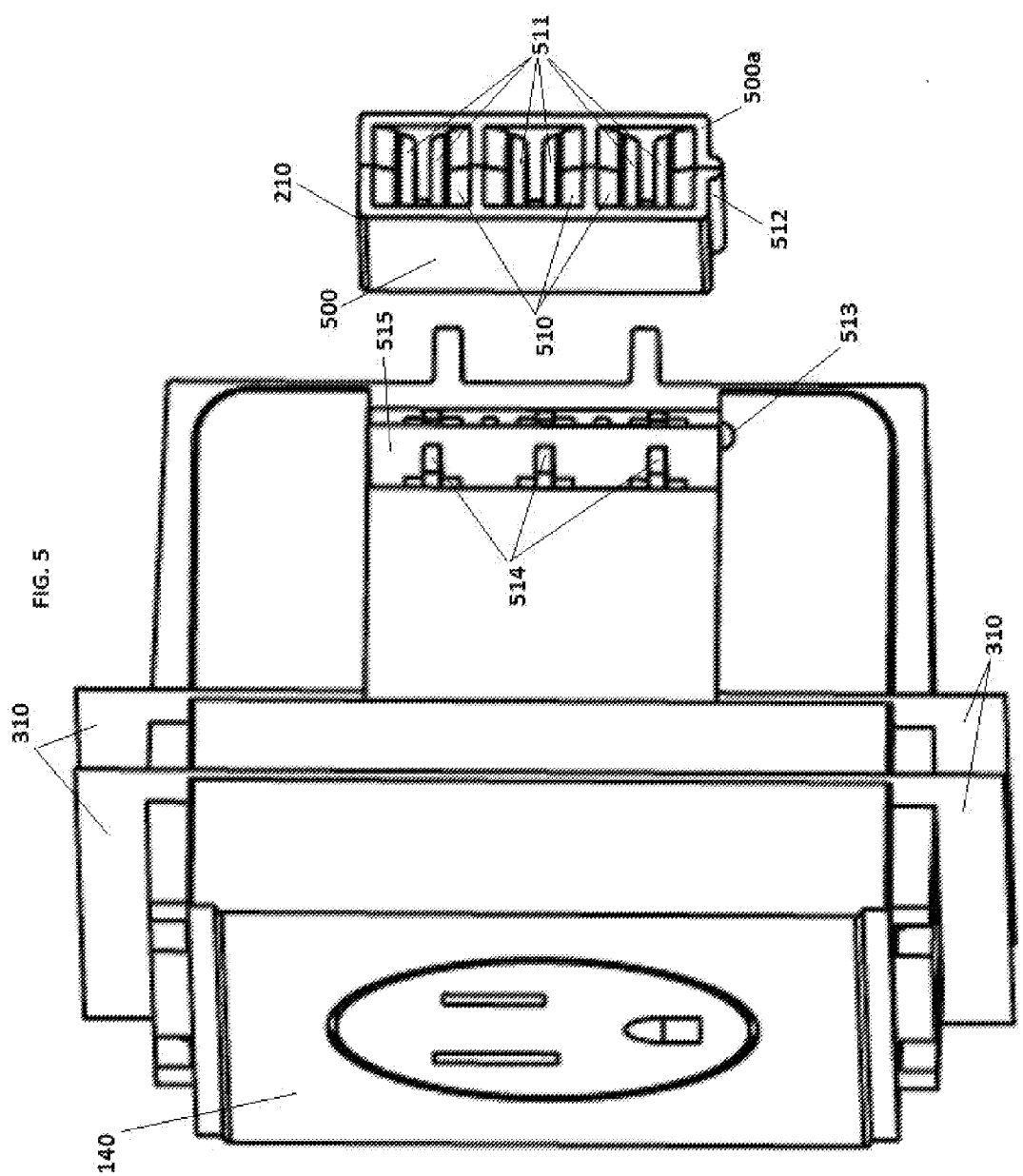
FIG. 5 is a side perspective view of the module connector and module used in an embodiment of the multi-function power strip.

FIG. 5 shows a side perspective view of the module connector and module used in an embodiment of the multi-function power strip. Shown in FIG. 5 is a switch module 110 with tabs 310 (as described with reference to FIG. 3), however, as set forth in the description of FIG. 2, module connectors 210 can be used with any of the modules described in the various embodiments of the multi-function power strip. Module connector 210 has a body 500 with a first end 500a. The opposite end of body 500 (not shown) is a mirror image of first end 500a. Body 500 of module connector 210 can be fabricated from any suitable material known in the art, for example, plastic. Apertures 510 are provided in first end body 500a and extend all the way through the body to the opposite end (not shown). In such a way, the body 500 has a hollow interior formed by the apertures 510. Three apertures 510 are shown in FIG. 5, however, it should be apparent to one of ordinary skill in the art that any number of apertures could be used, depending on the number of connections that must be made between the modules. By way of example and without limitation, the three apertures shown in FIG. 5 may accommodate positive, negative and ground connections between modules. In applications where an additional number of connections are required, as for example in cases where data or transformed voltages are also to be transferred between modules, more apertures may be provided. Body 500 may also be provided with an alignment boss 512. Alignment boss 512 mates with alignment groove 513 on the module. Alignment boss 512 and alignment groove 513 ensure that the module connector 210 and the module are connected in the appropriate orientation.

Disposed within the apertures 510 are contacts 511. Similar contacts (not shown) are disposed on the opposite end of body 500 (not shown). The contacts 511 may be made from copper or any material suitable for conducting electricity. The contacts 511 mate with and form an electrical connection with the blades 514 disposed on the module. The contacts 511, and the similar contacts (not shown) on the opposite end of body 500 are electrically connected. The similar contacts (not shown) on the opposite end of body 500 are likewise adapted to mate with blades (not shown) on an adjacent module. In this way, the contacts in the module connector 210 form an electrical connection between two adjacent modules.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. A multi-function power strip comprising:
a first endcap and a second endcap, wherein the first endcap is adapted to receive a power cord for supplying electrical power to the power strip;
at least one rail, having a proximal end and a distal end, and wherein said first endcap is attached to the proximal end of the rail and said second endcap is attached to the distal end of the rail, said rail being adapted to engage with at least one outlet module, said outlet module in electrical connection with the first endcap and adapted to receive electrical power therefrom;
wherein the rail is further engaged with a transformer module, said transformer module in electrical connection with the at least one outlet module, and adapted to receive electrical power therefrom, said transformer module further comprising a transformer adapted to transform electrical power into a plurality of voltages suitable for powering a plurality of different models of electronic accessories, and at least one connector electrically connected to the transformer, and having a plurality of pins, each of the plurality of pins having a designated one of the plurality of voltages supplied thereto, and wherein the at least one connector is configured to engage with a plurality of plugs, each of the plugs forming an electrical connection with a designated one of the plurality of pins and a neutral pin, thereby forming a circuit to provide a suitable one of the plurality of voltages to an electronic accessory;
wherein the rail is further engaged with a Universal Serial Bus (USB) module, said USB module in electrical connection with the transformer module, and adapted to receive electrical power therefrom, said USB module further comprising a transformer adapted to transform electrical power into a voltages suitable for distribution through a USB port, and at least one USB port, wherein the transformer is electrically coupled to the at least one USB port;
wherein the rail is further engaged with a network module, said network module in electrical connection with the USB module, and adapted to receive electrical power therefrom, said network module further comprising a plurality of network ports in electrical connection with each other, including a first network port and second network port, wherein said first network port is adapted to receive a data feed and said second network port is adapted to provide the data feed to a personal computer or other devices connected to the second network port; and
wherein the at least one outlet module, the transformer module, the USB module and the network module are releasably joined together and releasably attached to the rail.

2. The multi-function power strip of claim 1, wherein the network module further comprises a network switch.

3. The multi-function power strip of claim 1, wherein the network module further comprises a transformer for stepping down the household electrical power to a voltage suitable for use in the network module.

4. The multi-function power strip of claim 1, wherein the network module receives voltage suitable for use in the network module from another component in the power strip.

5. The multi-function power strip of claim 1, wherein one of the network ports is a LAN input port.

6. The multi-function power strip of claim 5, wherein the LAN input port is electrically connected to circuitry which controls the flow of data between the LAN input port and the remaining network ports.

7. The multi-function power strip of claim 1, wherein the power strip further comprises a plurality of connectors having no exposed terminals for connecting the at least one outlet module the transformer module, the USB module and the network module.

8. The multi-function power strip of claim 1, wherein the power strip further comprises at least one of the modules selected from the group consisting of a timer module and an occupancy sensor module.

9. The multi-function power strip of claim 1, wherein the power strip further comprises a surge suppression module, electrically connected to the outlet modules, the transformer module, the USB module and the network module for preventing power surges.

10. The multi-function power strip of claim 1, wherein the power strip further comprises a surge suppression module for at least one line type selected from the group consisting of phone lines, data lines, and CATV lines.

11. A multi-function power strip comprising:
a first endcap and a second endcap, wherein the first endcap is adapted to receive a power cord for supplying electrical power to the power strip;
at least one rail, having a proximal end and a distal end, and wherein said first endcap is attached to the proximal end of the rail and said second endcap is attached to the distal end of the rail, said rail being adapted to engage with at least one outlet module, said outlet module in electrical connection with the first endcap and adapted to receive electrical power therefrom;
wherein the rail is further engaged with at least one additional module selected from the group comprising:
a transformer module further comprising a transformer adapted to transform electrical power into a plurality of voltages suitable for powering a plurality of different models of electronic accessories, and at least one connector electrically connected to the transformer and having a plurality of pins, each of the plurality of pins having a designated one of the plurality of voltages supplied thereto, and wherein the at least one connector is configured to engage with a plurality of plugs, each of the plugs forming an electrical connection with a designated one of the plurality of pins and a neutral pin, thereby forming a circuit to provide a suitable one of the plurality of voltages to an electronic accessory;
a Universal Serial Bus (USB) module, further comprising a transformer adapted to transform electrical power into a voltages suitable for distribution through a USB port, and at least one USB port, wherein the transformer is electrically coupled to the at least one USB port;
a network module further comprising a plurality of network ports in electrical connection with each other, including a first network port and second network port, wherein said first network port is adapted to receive a data feed and said second network port is adapted to provide the data feed to a personal computer or other devices connected to the second network port; and
wherein the at least one outlet module and the at least one additional module are connected by a module connector, said module connector having a body with a first end and a second end, the second end being a mirror image of first end; at least one aperture provided in the first end of body and extending all the way through the body to the second end; a first contact disposed within the at least one aperture at the first end of the body and a second contact disposed in the at least one aperture at the second end of the body, wherein the first and second contacts are electrically connected; and
wherein the first and second contacts mate with blades disposed in the at least one outlet module and the at least one additional module thereby forming an electrical connection between two adjacent modules.

12. The multifunction power strip of claim 11, wherein the blades are disposed in an opening in the at least one outlet module and the at least one additional module.

13. The multifunction power strip of claim 12, wherein the blades do not protrude past the side of the at least one outlet module and the at least one additional module to prevent the blades from making accidental contact with persons or things which may cause an electrical shock or short circuit.

14. The multifunction power strip of claim 11, wherein the module connector is adapted to slide into an opening in the at least one outlet module and the at least one additional module.

15. The multifunction power strip of claim 11, wherein at least three apertures are provided in the module connector.

16. The multifunction power strip of claim 11, wherein the module connector further comprises an alignment boss.

17. The multifunction power strip of claim 16, wherein the at least one outlet module and the at least one additional module are both provided with alignment grooves to receive the alignment boss on the module connector.

18. The multifunction power strip of claim 11, wherein the contacts are made from copper.

19. The multifunction power strip of claim 11, wherein the contacts are made from any material suitable for conducting electricity.

20. A multi-function power strip comprising:
a cord for connection to an electrical power source:
a plurality of outlet modules in electrical connection with the cord, wherein said plurality of outlet modules are in electrical connection with each other; and
at least one additional module selected from the group comprising:
a transformer module further comprising a transformer adapted to transform electrical power into a plurality of voltages suitable for powering a plurality of different models of electronic accessories, and at least one connector electrically connected to the transformer and having a plurality of pins, each of the plurality of pins having a designated one of the plurality of voltages supplied thereto, and wherein the at least one connector is configured to engage with a plurality of plugs, each of the plugs forming an electrical connection with a designated one of the plurality of pins and a neutral pin, thereby forming a circuit to provide a suitable one of the plurality of voltages to an electronic accessory;
a Universal Serial Bus (USB) module, further comprising a transformer adapted to transform electrical power into a voltages suitable for distribution through a USB port, and at least one USB port, wherein the transformer is electrically coupled to the at least one USB port;
a network module further comprising a plurality of network ports in electrical connection with each other, including a first network port and second network port, wherein said first network port is adapted to receive a data feed and said second network port is adapted to provide the data feed to a personal computer or other devices connected to the second network port; and
wherein the at least one outlet module and the at least one additional module are connected by a module connector, said module connector having a body with a first end and a second end, the second end being a mirror image of first end; at least one aperture provided in the first end of body and extending all the way through the body to the second end; a first contact disposed within the at least one aperture at the first end of the body and a second contact disposed in the at least one aperture at the second end of the body, wherein the first and second contacts are electrically connected; and
wherein the first and second contacts mate with blades disposed in the at least one outlet module and the at least one additional module thereby forming an electrical connection between two adjacent modules.

* * * * *